(12) United States Patent
Werlen et al.

(10) Patent No.: US 11,499,765 B2
(45) Date of Patent: *Nov. 15, 2022

(54) DEVICE AND PROCESS FOR REFUELING CONTAINERS WITH PRESSURIZED GAS

(71) Applicant: L'Air Liquide, Societe Anonyme pour l'Etude et l'Exploitation des Procedes Georges Claude, Paris (FR)

(72) Inventors: Etienne Werlen, Kobe (JP); Marcus Buck, Wiesbaden (DE)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/526,323

(22) Filed: Jul. 30, 2019

(65) Prior Publication Data

US 2020/0039811 A1 Feb. 6, 2020

(30) Foreign Application Priority Data

Aug. 1, 2018 (EP) .................................... 18306047
Aug. 1, 2018 (JP) ............................. JP2018-145243

(51) Int. Cl.
*F25B 49/02* (2006.01)
*B67D 7/80* (2010.01)
(Continued)

(52) U.S. Cl.
CPC ................ *F25B 49/02* (2013.01); *B67D 7/36* (2013.01); *B67D 7/78* (2013.01); *B67D 7/80* (2013.01);
(Continued)

(58) Field of Classification Search
CPC ...... F17C 5/007; F17C 5/06; F17C 2221/012; F17C 2223/0123; F17C 2227/0341; F17C 2265/065; F17C 2270/0139
See application file for complete search history.

(56) References Cited

U.S. PATENT DOCUMENTS 9,528,657 B2 * 12/2016 Allidieres ............. F17C 13/026
9,845,916 B2   12/2017 Allidieres
(Continued)

FOREIGN PATENT DOCUMENTS

EP   2 491 318   8/2012
EP   2 738 482   6/2014
(Continued)

OTHER PUBLICATIONS

James, Will. "An Introduction to SAE Hydrogen Fueling Standardization", U.S. Department of Energy Fuel Cell Technologies Office, Published Dec. 21, 2016 (Year: 2016).*
(Continued)

*Primary Examiner* — Timothy L Maust
*Assistant Examiner* — Christopher M Afful
(74) *Attorney, Agent, or Firm* — Christopher J. Cronin

(57) ABSTRACT

A device for refuelling containers with pressurized gas, comprising a pressurized gas source, a transfer circuit intended to be removably connected to a container, the device comprising a refrigeration system for cooling the gas flowing from the gas source prior to its entering into the container, the refrigeration system comprising a refrigerant cooling loop circuit comprising, arranged in series, a compressor, a condenser section, an expansion valve and an evaporator section, the refrigeration system comprising a cold source in heat exchange with the condenser section and a heat exchanger located in the transfer circuit, the device comprising an electronic controller connected to the expan-
(Continued)

sion valve and configured for controlling cooling power produced by the refrigeration system via the control of the opening of the expansion valve, the device comprising a differential temperature sensor system measuring the difference between the temperature of the refrigerant in the refrigerant cooling loop circuit at the outlet of the heat exchanger and the temperature of the refrigerant in the cooling loop circuit at the inlet of the heat exchanger, the electronic controller being configured for controlling the cooling power produced as a function of this temperature differential.

16 Claims, 2 Drawing Sheets

(51) Int. Cl.
| | |
|---|---|
| B67D 7/36 | (2010.01) |
| B67D 7/78 | (2010.01) |
| F17C 13/02 | (2006.01) |
| F17C 5/00 | (2006.01) |
| F17C 5/06 | (2006.01) |
| F25B 41/20 | (2021.01) |

(52) U.S. Cl.
CPC ............... *F17C 5/007* (2013.01); *F17C 5/06* (2013.01); *F17C 13/026* (2013.01); *F25B 41/20* (2021.01); *F17C 2221/012* (2013.01); *F17C 2227/0157* (2013.01); *F17C 2227/0341* (2013.01); *F17C 2250/032* (2013.01); *F17C 2250/0439* (2013.01); *F17C 2250/0631* (2013.01); *F17C 2270/0184* (2013.01)

(56) References Cited

U.S. PATENT DOCUMENTS

| | | |
|---|---|---|
| 9,845,917 B2 | 12/2017 | Allidieres |
| 10,655,784 B2 | 5/2020 | Fujisawa et al. |
| 10,920,933 B2 | 2/2021 | Werlen et al. |
| 2012/0011866 A1 | 1/2012 | Scarcella et al. |
| 2012/0198868 A1 | 8/2012 | Huff et al. |
| 2014/0311622 A1 | 10/2014 | Cohen |
| 2016/0146400 A1 | 5/2016 | Allidieres |
| 2016/0348840 A1 | 12/2016 | Nagura et al. |
| 2018/0119967 A1 | 5/2018 | Keshavan Raghavan |
| 2019/0032849 A1 | 1/2019 | Seki et al. |
| 2019/0041003 A1 | 2/2019 | Hashimoto et al. |

FOREIGN PATENT DOCUMENTS

| | | | |
|---|---|---|---|
| EP | 2 812 640 | 12/2014 | |
| JP | 2015-092108 | 5/2015 | |
| JP | 2016-053457 | 4/2016 | |
| WO | WO 2009/091400 | 7/2009 | |
| WO | WO 2009/135297 | 11/2009 | |
| WO | WO 2018/104982 | 6/2018 | |
| WO | WO 2018/104983 | 6/2018 | |
| WO | WO-2018104982 A1 * | 6/2018 | ............... F17C 7/00 |

OTHER PUBLICATIONS

Krishna Reddi et al. "Impact of hydrogen SAE J2601 fueling methods on fueling time of light-duty fuel cell electric vehicles", Published Jun. 29, 2017 (Year: 2017).*
EP Search Report for EP18306047, dated Apr. 1, 2019.
EP Search Report for EP 18306043, dated Dec. 4, 2018.
EP Search Report for EP 18306046, dated Jan. 10, 2019.

* cited by examiner

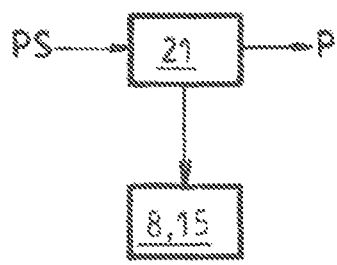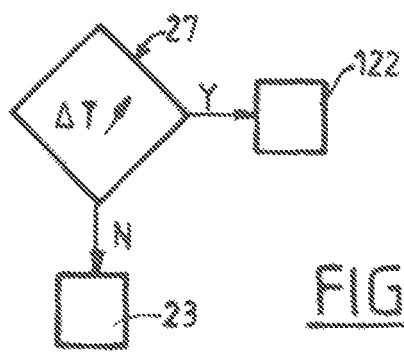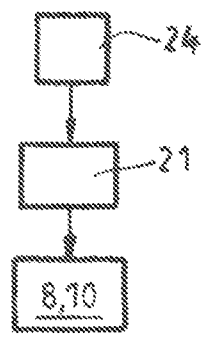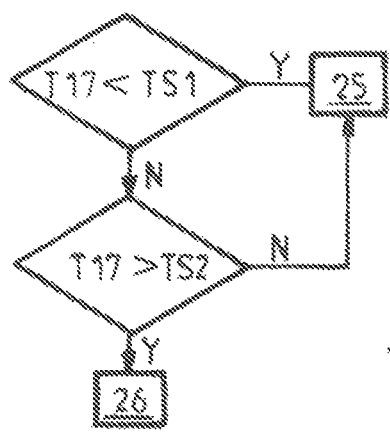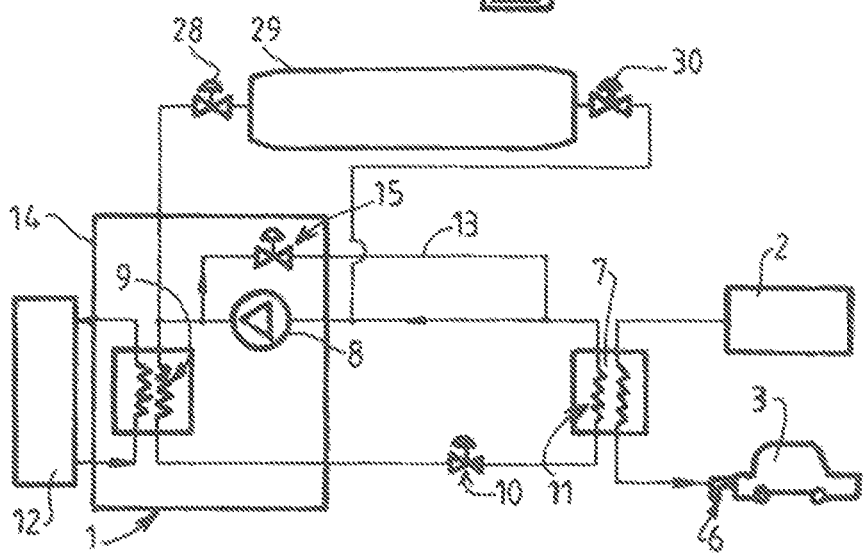

DEVICE AND PROCESS FOR REFUELING CONTAINERS WITH PRESSURIZED GAS

CROSS-REFERENCE TO RELATED APPLICATIONS

This application claims the benefit of priority under 35 U.S.C. § 119 (a) and (b) to Japanese patent application No. JP 2018-145243, filed Aug. 1, 2018, and EP patent application no. EP18306047, filed Aug. 1, 2018, the entire contents of which are incorporated herein by reference.

BACKGROUND

Field of the Invention

The invention relates to a device and process for refuelling containers with pressurized gas.

The invention relates more particularly to a device for refuelling containers with pressurized gas, notably for refuelling gaseous hydrogen tanks, comprising a pressurized gas source, a transfer circuit comprising one upstream end connected to the gas source and at least one downstream end (6) intended to be removably connected to a container, the device comprising a refrigeration system for cooling the gas flowing from the gas source prior to its entering into the container, the refrigeration system comprising a refrigerant cooling loop circuit comprising, arranged in series, a compressor, a condenser section, an expansion valve and an evaporator section, the refrigeration system comprising a cold source in heat exchange with the condenser section and a heat exchanger located in the transfer circuit and comprising a heat exchange section between the gas flowing in the transfer circuit and the evaporator section.

Related Art

Hydrogen refuelling stations are designed for fast refuelling (few minutes) of Fuel Cell Electrical Vehicles (FCEV) with hydrogen at high pressure (for example equal or above 70 MPa). Hydrogen needs to be precooled (generally below −33° C.) at dispenser refuelling nozzle in order to avoid overheating in the tank.

A known cooling or refrigeration system feeds a hydrogen cooling heat exchanger with a refrigerant of a refrigerant cooling loop circuit.

Refrigerant may be $CO_2$. See for example documents JP2015092108A or US2016348840A. See also WO2018104982A1.

Generally, the heat exchanger includes a mass or block of material for storing cold for responding to high demand. The refrigeration device may provide nearly constant cooling and the cooling energy is stored in the thermal inertia of the heat exchanger (high thermal inertia).

However, the thermal inertia may be not sufficient in some situations to provide the cold needed. In addition, when using another type of heat exchanger (ex: a compact diffusion bonded heat exchanger) the thermal inertia is small. In that cases, the cooling energy has to be provided when there is a demand. This demand might change within seconds from zero to full cooling power.

Most efficient use of the cooling power is done using counter-current heat exchanger. In that case, it is desirable that the temperature of the refrigerant at the inlet to the heat exchanger remains in a pre-determined range of temperature.

For that purpose, a pre-determined evaporation pressure range should be maintained at the inlet of the heat exchanger. Also, sufficient superheat should be maintained at the suction of the compressor. Superheat is for example the predetermined amount of heat added to the refrigerant after it has already vaporized. It can be defined by a temperature at a given pressure and may be measured at the outlet of the heat exchanger or at compressor inlet. The evaporation temperature of the refrigerant depends on pressure.

The reason why superheat is controlled is to make sure that the liquid refrigerant in the evaporator section has fully changed from a liquid to vapor (since it is wanted to have only vapor returning to the compressor suction/inlet).

The refuelling device (or station) may also be set in standby mode (waiting situation for refuelling) for an extended time. And even if there is a refuelling, the amount of gas might below the maximum design values. In those cases, the refrigeration system will operate at low load.

SUMMARY OF THE INVENTION

One goal is to overcome or reduce at least one of the preceding problems.

To this end, the device according the invention, according to the generic definition above, is essentially characterized in that the device comprises an electronic controller connected to the expansion valve and configured for controlling cooling power produced by the refrigeration system via the control of the opening of the expansion valve, wherein, the device comprises a differential temperature sensor system measuring the difference between the temperature of the refrigerant in the refrigerant cooling loop circuit at the outlet of the heat exchanger and the temperature of the refrigerant in the cooling loop circuit at the inlet of the heat exchanger, the electronic controller being configured for controlling the cooling power produced as a function of this temperature differential.

In addition, (or alternatively), embodiments might include one or several of the below features:
  the electronic controller is configured to increase the amount of refrigerant sent to the heat exchanger if the differential temperature increases,
  the electronic controller is configured to decrease the amount of refrigerant sent to the heat exchanger if the differential temperature decreases,
  the electronic controller is configured for controlling the cooling power produced as a feed forward control signal on the valve opening,
  the temperature differential is calculated based on temperature sensors located respectively at outlet and inlet of the heat exchanger,
  the expansion valve opening is controlled via a closed loop control on refrigerant temperature difference between inlet and outlet of the heat exchanger,
  the cooling power is controlled with proportional and/or modulated opening times or the expansion valve,
  the refrigerant cooling loop circuit comprises a bypass conduit comprising an upstream end connected to the outlet of the compressor and a downstream end connected to the refrigerant cooling loop circuit upstream the compressor inlet and bypassing the condenser section and expansion valve, the device comprising a bypass regulating valve for controlling the flow of refrigerant flowing into the by-pass conduit,
  the downstream end of the bypass conduit is connected at the outlet of the heat exchanger of the transfer circuit, the bypass valve is a controlled valve able to be set in a closed position or a plurality of open positions for varying the flowrate of refrigerant flowing in the bypass conduit, the electronic controller being connected to the bypass valve and being configured for controlling the opening of said the bypass valve, the electronic controller is configured to generate or receive a signal indicative of the cooling power needed at heat exchanger for cooling the flow of gas in the transfer circuit through the heat exchanger and, in response, for controlling the cooling power produced by the refrigeration accordingly, the process comprises a step of decreasing the amount of refrigerant sent to the heat exchanger if the differential temperature decreases, The invention also deals with a process for refuelling containers with pressurized gas, notably for refuelling gaseous hydrogen tanks, with a device comprising gas source, a transfer circuit for transferring compressed gas from the gas source to a container, the process comprising a step of cooling a heat exchanger located in the transfer circuit, the heat exchanger being in heat exchange with the gas flowing from the source to the container(s), the step of cooling comprising the production of a cooling power in a evaporator section of a refrigerant cooling loop circuit, the cooling loop circuit comprising, arranged in series, a compressor, a condenser section, an expansion valve and the evaporator section, the condenser section being in heat exchange with a cold source, the process comprising the step of controlling the cooling power produced as a function of the temperature differential between the temperature of the refrigerant in the refrigerant cooling loop circuit at the outlet of the heat exchanger and the temperature of the refrigerant in the cooling loop circuit at the inlet of the heat exchanger.

According to other embodiments, the invention can include one or several of the below features:
the expansion valve opening is controlled via a closed loop control on refrigerant temperature difference between inlet and outlet of the heat exchanger,
that it comprises a step of increasing the amount of refrigerant sent to the heat exchanger if the differential temperature increases,
the process comprises a step of controlling the cooling power produced at the evaporator section of the refrigerant cooling loop circuit as a function of a signal indicative of the cooling power demand at the heat exchanger, said signal including at least one among: the quantity or flowrate of gas flowing through the transfer circuit, the temperature of the gas flowing through the transfer circuit, the pressure of the gas flowing through the transfer circuit, a pressure or pressure change in the gas source, a demand from a user for refuelling a container, a wireless signal.

The invention may also relate to any alternative device or process comprising any combination of the above or below features within the scope of the claims.

BRIEF DESCRIPTION OF THE FIGURES

Other particularities or advantages will be apparent from the reading of the below description, referring to the drawings wherein:

FIG. 5 is a schematic and partial view of one possible operation of the device and process, FIG. 6 is a schematic and partial view of one possible operation of the device and process, FIG. 7 is a schematic and partial view of one possible operation of the device and process, FIG. 8 is a schematic and partial view of one possible operation of the device and process, FIG. 9 is schematic and partial view showing the structure and operation of a refuelling device according to a further embodiment.

DETAILED DESCRIPTION OF THE INVENTION

Figure 1:
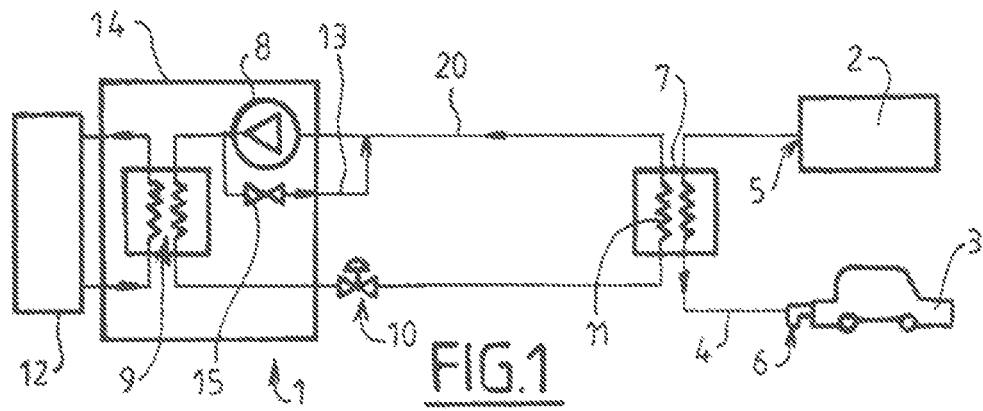
FIG. 1 is schematic and partial view showing the structure and operation of a refuelling device according to a first embodiment.

As illustrated in the drawings, the device 1 for refuelling containers 3 might be a fuelling station for refuelling a pressurized gas to vehicle tanks (for example hydrogen but it may apply to other gases such as natural ga).

The device 1 comprises a pressurized gas source 2, a transfer circuit 4 comprising one upstream end 5 connected to the gas source 2 and at least one downstream end 6 (for example provided with a nozzle) intended to be removably connected to a container or tank 3 to be filled.

The gas source 2 may include for example at least one among: pressurized gas storage(s) or buffer(s), compressor(s), bundle(s) of pressurized gas cylinders or tube trailers(s), a liquefied gas source and a vaporiser, an electrolyser, a gas network outlet.

The transfer circuit 4 may comprise a set of valves controlled by an electronic controller according to a predefined refuelling strategy (pressure increase or rate of pressure increase and/or mass injected control and/or control of the density in the tank 3 and/or control of the temperature increase in the tank 3).

The device 1 comprises a refrigeration system for cooling the gas flowing from the gas source 2 prior to its entering into the container 3 (for example to a predefined temperature below 0° C. notably between −33° C. and −40° C.). The cooled gas temperature may also be controlled to vary according to refuelling condition(s) (as a function of temperature and/or pressure in the tank 3, rate of pressure increase in the tank 3, flowrate of gas in the transfer circuit 4, the ambient temperature . . . ).

The refrigeration system comprises a refrigerant cooling loop circuit 20 comprising, arranged in series, a compressor 8, a condenser section 9, an expansion valve 10 and an evaporator section 11. The refrigerant flowing in the cooling loop circuit 20 is preferably carbon dioxide but another refrigerant might be used such as R717 (ammonia), R22, R134a, R404a, R507 or any refrigerant capable of reaching a temperature of at least −40° C.

The condenser section 9 may include heat exchanger for cooling the refrigerant compressed by the compressor 8.

The refrigeration system comprises a cold source 12 in heat exchange with the condenser section 9. This cold source 12 may include a cooling fluid circuit such as a loop. For example, air, water, nitrogen or any appropriate cooling fluid or refrigerant. The cold source may include any other cold organ or device able to cool the refrigerant such as thermoconvectors, cooling tower or secondary refrigerating cycle. The cooling fluid from the cold source 12 may be in heat exchange with the condenser section 9 in a heat exchanger.

The refrigeration system comprises preferably a heat exchanger 7 located in the transfer circuit 4 and comprising a heat exchange section between the gas flowing in the transfer circuit 4 and the evaporator section 11. The evaporator section 11 may comprise a circuit (for example coils) in heat exchange with the transfer circuit 4 and/or with a mass of material (aluminum or the like) forming an organ having a high thermal inertia for storing cold (for example a several centimetres thick metal or aluminum block and/or other material such a Phase Change Material).

The refrigerant cooling loop circuit 20 may comprise a bypass conduit 13 comprising an upstream end connected to the outlet of the compressor 8 and a downstream end connected upstream the compressor 8 in the refrigerant cooling loop circuit 20 and bypassing the condenser section 9 and expansion valve 10. The refrigeration device may comprise a bypass regulating valve 15 for controlling the flow of refrigerant flowing into the by-pass conduit 13.

As illustrated in FIG. 1 at least part of: the compressor 8, the condenser section 9, the cold source 12, the bypass regulating valve, and possibly the expansion valve 10 might be located in a frigorific module 14.

As illustrated in FIG. 1, the downstream end of the optional bypass conduit 13 (the upstream may connected to the compressor outlet) may be connected directly to the suction line of the compressor 8. This means that the hot compressed bypassed refrigerant may be reinjected directly into the inlet of the compressor 8.

In another possible embodiment (FIG. 2) the downstream end of the bypass conduit 13 may be connected upstream the inlet of the heat exchanger 7. This solution allows the mixing of the hot compressed bypassed refrigerant and the colder refrigerant flow regulated by the expansion valve 10 before entering into the heat exchanger 7. This permits the expansion valve 10 to maintain superheat level (a sufficient temperature) in the circuit. This allows also a higher fluid velocity in the heat exchanger 7 and suction line of the compressor.

In case the compressor is an oil lubricated piston compressor, this allows to better carry along oil that would have leaked and accumulated in the refrigerant circuit and especially in the heat exchanger 7. However, at low evaporator load keeping the temperature at the heat exchanger inlet constant might be more difficult to control.

Figure 3:
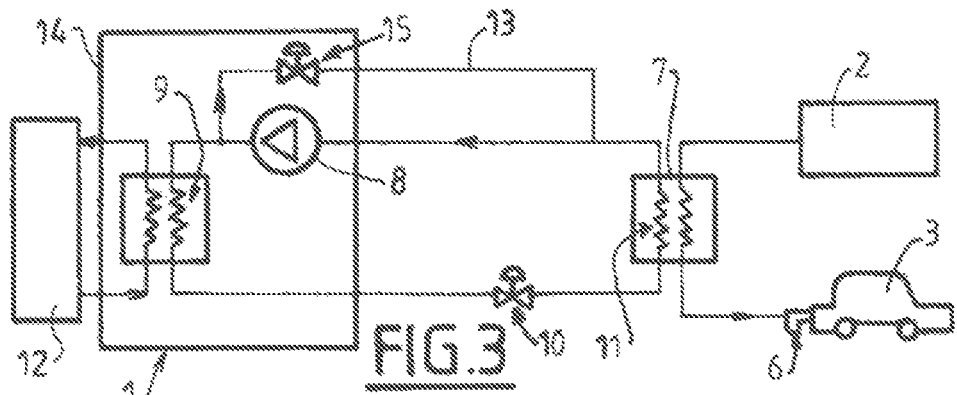
FIG. 3 is schematic and partial view showing the structure and operation of a refuelling device according to a third embodiment.
Figure 4:
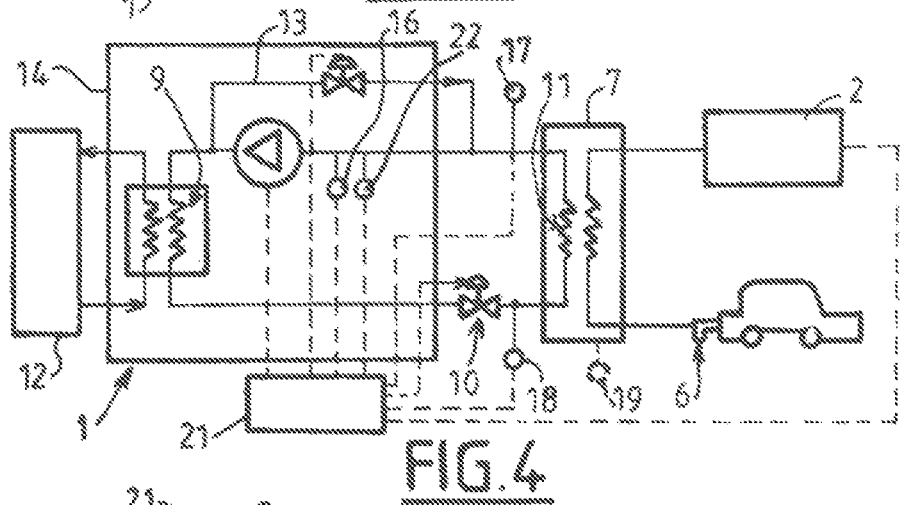
FIG. 4 is schematic and partial view showing the structure and operation of a refuelling device according to a fourth embodiment.

In another possible embodiment illustrated in FIGS. 3 and 4, the downstream end of the bypass conduit 13 is connected to the outlet of the heat exchanger 7 of the transfer circuit 4. This is to say the hot compressed bypassed refrigerant is reinjected and mixed with the refrigerant exiting the said heat exchanger 7.

This means that the hot compressed bypassed refrigerant is not injected in the compressor 8 inlet or suction line but more upstream and preferably closer to the refrigerant outlet of the heat exchanger 7. For example, the downstream end of the bypass conduit 13 is tied up (connected) in the refrigerant cooling loop circuit 20 just after the evaporator 11 section, for example between twenty cm and forty cm after the outlet of this evaporator 11 section or after the outlet of the heat exchanger 7. And preferably this connection of the hot gas bypass conduit 13 is not too close to a refrigerant temperature measurement 17 at the outlet of the evaporator 11.

This permits to avoid or limit influence of the bypass fluid on temperature measured 17). Thus preferably, a temperature measurement 17 is as close as possible to the outlet of the evaporator 11 (for example around 5-10 cm from the outlet due to the required fittings) and the tie in of the bypass conduit 13 is around 20-30 cm downstream or the outlet or 30 to 30 cm downstream the temperature sensor 17 (for example 20 to 30 cm downstream a first bend of the refrigerant circuit/conduit). However, the evaporator 11 is generally mounted inside a dispenser and the pipes come from below, the location is nearly automatically defined due to the available space.

Figure 2:
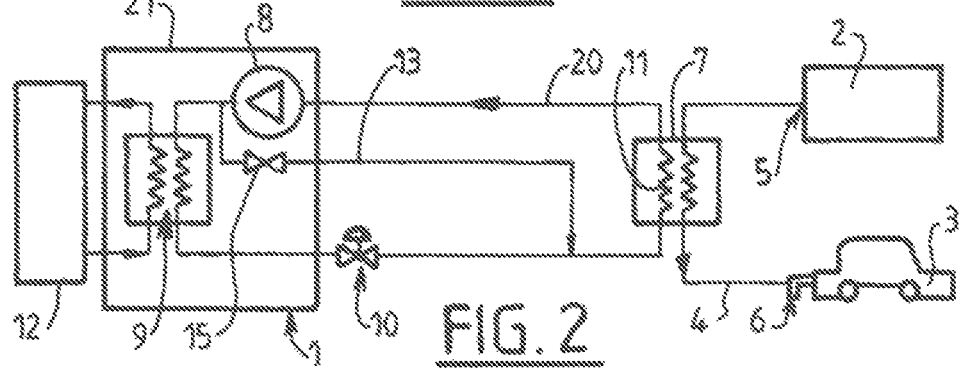
FIG. 2 is schematic and partial view showing the structure and operation of a refuelling device according to a second embodiment.

Compared to the solution described on FIG. 2, this solution prevents or lowers the problems of a fluctuating temperature at the inlet of the heat exchanger 7 as there is not mixing of hot and cold refrigerant at the inlet of the heat exchanger 7. Compared to the solution described on FIG. 1, this solution helps oil return and prevents liquid refrigerant accumulation in the return line of the refrigerant cooling loop circuit 20 (i.e. in the line from heat exchanger to the compressor inlet.

Preferably, the bypass valve 15 is a controlled valve able to be set in a closed position or a plurality of open positions or able to be set in opened and closed positions (for example full open and full closed) for modulated periods of time (e.g. Pulse Width Modulation on solenoid valves for example). This allows interrupting or for varying the flowrate of refrigerant flowing in the bypass conduit 13.

The device 1 preferably comprises an electronic controller 21.

The electronic controller 21 may comprise organ(s) for storing treating receiving and/or sending data. For example, it comprises microprocessor(s) and/or calculator(s) and/or computer. The electronic controller 21 might be located in the device or station or might distant. This electronic controller 21 may also control the flow of gas in the transfer circuit 4 to the tank 3.

The electronic controller 21 may be connected to the bypass valve 15 and configured (for example programmed) for controlling the opening of said the bypass valve 15 (see FIG. 4).

The compressor 8 is preferably a variable speed compressor. The electronic controller 21 might be connected to the compressor 8 and configured for controlling the compressor 8 (on/off state) and the compressor 8 speed.

The cooling power of the refrigeration system may be primarily controlled by the opening of expansion valve 10. The controller 21 is preferably connected to the expansion valve 10 and configured for controlling cooling power produced by the refrigeration system via the control of the opening of the expansion valve 10.

In order to maintain a constant evaporation pressure, the suction pressure upstream the compressor 8, especially at the inlet of heat exchanger 7, has to remain in a predetermined range.

The control of the evaporation pressure might thus be made via the control of the bypass valve 15 and the compressor 8 speed.

The evaporation temperature, i.e. the temperature of the refrigerant after the expansion valve is depending on the pressure downstream of the expansion valve 10.

Based on the desired evaporation temperature (for a predetermined cooling of the refuelling gas) the required suction pressure can be calculated (by mean of appropriate equation of state or correlation).

The pressure can be measured at the exchanger 7 or preferably at the suction side of the compressor 8. As illustrated in FIG. 4, the device may comprise a pressure sensor 16 for sensing the refrigerant pressure in the cooling loop circuit 20 between the compressor 8 inlet and the heat exchanger 7 outlet, notably at the inlet of the compressor 8.

To compensate for pressure losses, a measurement 18 of the temperature at the inlet of the heat exchanger 7 may be used to decrease the set point of the suction pressure control.

As illustrated in FIG. 4, the device may comprise a temperature sensor 18 for sensing the refrigerant temperature in the evaporation section 11 upstream the heat exchanger 7, notably at the inlet of the heat exchanger 7.

The temperature at the inlet 18 is equal to the evaporation temperature given by the suction pressure. Instead of measuring, a calculated inlet temperature via the suction pressure reacts faster and gives better control.

In this context the terms "temperature sensor" means a device for directly or indirectly measuring a temperature and/or a device for calculating the temperature based on appropriate parameter(s).

The suction pressure of the compressor 8 may be controlled with the control of the flow of hot gas admitted in the bypass conduit 13 and with the speed of the compressor 8.

Zero refrigerant flow through the heat exchanger 7 may be achieved if the compressor 8 is at minimum speed (or stopped) and the bypass regulating valve 15 is fully open.

The maximum flow of refrigerant through the heat exchanger 7 is obtained when bypass regulating valve 15 is closed and the compressor 8 is at its maximum speed.

This relation might be controlled with a split range control technology.

This permits to make sure that there is always sufficient superheat at the suction side of the compressor 8.

Fast load changes may result in fast reactions of the expansion valve 10. This has an effect on the suction pressure of the compressor 8. For a fast reaction of the pressure control, the opening of the expansion valve 10 can be as associated with a feed forward signal to the pressure control output (i.e. by-pass regulating valve 15 and compressor 8 speed setpoints).

If the cooling demand increases, the opening of expansion valve 10 is increased. To keep the evaporation pressure constant, the signal to the expansion valve 10 may also be used to calculate a feed forward signal to the suction pressure control. This means that the increase of the opening of the expansion valve might command the decrease of the by-passed refrigerant flow and/or the increase of compressor 8 speed.

In typical refrigeration applications, the superheat (refrigerant temperature) can be measured just after the evaporator section 11 (at the outlet of the heat exchanger 7).

Alternatively, or in addition, it is possible to measure the superheat closer to the compressor 8 inlet, for example at the inlet of the frigorific module 14 (the frigorific module may be named also chiller).

The main reason to measure temperature close to the evaporator section 11 (heat exchanger 7) is energy consumption. In the device, the distance between the chiller and the dispenser 6 can be used to subcool the liquid refrigerant and increase the temperature of the gaseous refrigerant at the suction side of the compressor 8. For example, referring to FIG. 4, this can be achieved by running the line between the outlet of condensing section 9 and expansion valve 10, along with the line evaporative section 11 and superheat control 22, within the same heat insulation material or structure. For this reason, the superheat control is preferably controlled closer to the compressor 8 than to the heat exchanger 7.

Thus, the device 1 preferably comprises a temperature sensor 17 for sensing the refrigerant temperature in the refrigerant cooling loop circuit 20 between the compressor 8 inlet and the heat exchanger 7 outlet and, notably a sensor 22 at the inlet of the compressor 8.

The electronic controller 21 can configured for regulating the temperature of the refrigerant at the inlet of the compressor 8 in a predetermined temperature range via a control of the compressor 8 speed and the opening of the bypass valve 15.

As illustrated in FIG. 5, based on the actual (measured or calculated pressure P and the Pressure set-point PS (pressure needed), the electronic controller acts on the bypass valve 15 and compressor 8.

The control of the cooling power may be based on temperature measure (a superheat control) at the outlet of the heat exchanger 7. This control scheme works well when there are only slow changes in cooling demand. However, in case of tanks refuelling station, fast load changes might happen. The simple temperature control strategy would fail to keep the gas temperature (for example, $H_2$) to be cooled at the right temperature range for refuelling (typically between −33° C. and −40° C.).

In a typical refrigeration application, the cooling demand changes are quite slow. In those cases, the reaction speed of the chiller is thus not important.

For refuelling stations, the cooling demand may change within seconds from zero to full cooling power. For this reason, a single temperature based control might not be sufficient.

Preferably, the device comprises a differential temperature sensor system measuring the difference between the temperature of the refrigerant in the refrigerant cooling loop circuit 20 at the outlet of the heat exchanger 7 and the temperature of the refrigerant in the cooling loop circuit 20 at the inlet of the heat exchanger 7. The electronic controller 21 is configured for controlling the cooling power produced as a function of this temperature differential.

For example, the temperature differential is calculated based on temperature sensors 17, 18 at outlet and inlet of the heat exchanger 7.

The expansion valve 10 might be control via a closed loop control on refrigerant temperature difference between inlet 18 and outlet 17 of the heat exchanger 8. When there is no or low cooling power required, (heat exchanger cold in standby mode for example), temperature difference is very low. As the cooling demand increases, the temperature difference increases and the control will cause the expansion valve 10 to open as required.

As the actual cooling power is directly linked to the opening of the expansion valve 10 (typically with proportional and/or modulated opening times), a measurement to control if the supplied cooling power is too high or too low may thus be the temperature difference between refrigerant inlet and refrigerant outlet to heat exchanger 7.

The device 1 may be switched in a refuelling mode when there is a refuelling demand.

For example, the refuelling mode might be activated upon generating or receiving in the electronic controller 21 a signal or command. For example, a payment/demand from a user and/or when the refuelling nozzle 6 is removed from a base dispenser.

After the nozzle 6 is removed it may take some time (for example 10s to 20 s) for the user to attach the nozzle 6 to the car and to activate the refuelling sequence.

When the connection of the nozzle to the tank 3 is made, then a pressure pulse test may be done (about 30 s for example) and the actual refuelling can then start.

Within a short period after the refuelling starts (for example 30 seconds) a predetermined low gas temperature should be reached at the dispenser outlet 6 (for example about −33° C.).

The device can be designed so that within a time period (example 60s) after the nozzle is removed from its base the heat exchanger 7 is cooled at predetermined temperature (−38° C. for example).

This means that the heat exchanger is subcooled prior to the gas flow in the transfer circuit 4 to the tank 3.

If the system is in stand-by mode (as described below) when cooling of heat exchanger 11 prior to the gas flow is requested, electronic controller 21 may start compressor 8 and control expansion valve 10 and by-pass regulating valve 15 as described above. This will cause a fast cooling.

The refuelling of a tank 3 can take between 150 s and 500 s for example. During that time, the actual cooling demand may change rapidly. These rapid changes are typically too fast for a classical control. To maintain a stable temperature of the hydrogen a feed forward control is preferably implemented.

For example, the operating parameters of the refrigeration system will be based on the actual required cooling energy.

Thus, once the actual refuelling starts, the refuelling will create a cooling demand. Based on the actual cooling demand the required cooling power may be calculated/provided.

The electronic controller 21 may calculate and control the required refrigerant flow in the heat exchanger 7 (as the cooling demand increases the refrigerant flow has to increase accordingly).

The compressor 8 may start shortly after the refuelling start. To limit the power consumption, the refrigeration system may cool the internal heat exchanger 9 (condenser section) and the heat exchanger 7 as much as possible at the beginning.

As the cooling demand increases first the bypass valve 15 might be closed and then the compressor 8 speed might be increased as required. This can be done via a split range control.

To react faster on load changes, the required cooling power may be calculated based on the gas flow to be cooled. The calculated cooling demand may act as on offset to the electronic controller 21. The expansion valve 10 may thus be opened before a significant change in differential temperature occurs at the heat exchanger 7.

A feed forward control based on the actual cooling demand may be used. Based on the gas flow in the transfer circuit 4 and the (expected) inlet temperature, the required cooling power may be calculated. Based on the required cooling power, the required refrigerant flow can be calculated and then the required opening of the expansion valve 10. The required expansion valve 10 opening may thus be used to generate a feed forward signal for the cooling power control.

An estimate of the required cooling power may be calculated using the instrumentation available on the device 1. For example, the cooling power required might set equal to the gas flowrate to be cooled multiplied by the difference between the enthalpy of the gas at the inlet of the heat exchanger 7 and the enthalpy of said gas at the outlet of the heat exchanger 7. This can be calculated with the expected outlet gas temperature at the nozzle 6 (typically −40° C.). As a minimum, gas flow estimate may be needed. This can preferably be taken from a flow meter signal in the transfer circuit for example. But this can be also calculated from the signal of other instruments (e.g. a pressure drop or pressure change in the source 2 such as buffer(s)). To improve the accuracy of cooling power calculation, other measured values may be taken into account such as gas pressure upstream the heat exchanger 7, gas pressure downstream the heat exchanger 7, gas temperature upstream the heat exchanger, ambient temperature, temperature of the heat exchanger . . .

As illustrated in FIG. 7 a cooling power demand signal 24 will cause electronic controller 21 to acts on compressor 8 and bypass valve 10 to fit with the demand.

The device might also be put in a standby mode (between two fillings).

During this standby mode the heat exchanger 7 might be kept at a temperature that allows a quick start of a refuelling (with a predefined time period, for example within 60 s).

This requirement may define the maximum temperature of the heat exchanger 7 during standby mode. For example, if the refrigeration system is capable to cool the heat exchanger 7 by 20° K within 60 s, then the active cooling during standby mode shall start when the heat exchanger 7 temperature is above a predefined threshold, for example above −18° C.

If the system is at a low temperature (for example heat exchanger temperature below a first standby temperature threshold, for example below −20° C.) the system is put/kept in standby mode. The compressor is then preferably switched off.

During standby mode, the liquid refrigerant warms up and the pressure in the refrigerant cooling loop circuit 20 will increases.

To reduce the pressure in the refrigerant cooling loop circuit 20 (pressure increases beyond a preset limit), the cooling source 12 might be started to produce or provide cold to the refrigerant circuit.

In case the temperature of the heat exchanger 7 must be lowered (or maintained cold), the compressor 8 might be started. The start of compressor 8 will cause flow in the loop and a reduction of the pressure at its inlet.

The start of compressor 8 will cause flow in the loop and a reduction of the pressure at its inlet.

If during standby mode the heat exchanger 7 warms up too much, it is preferably cooled again.

At this operating scenario the time to reach the low temperature is not important. Thus the compressor 8 can be operated at the speed with the highest efficiency (typically its lowest speed).

At minimum speed of the compressor 8, the cooling power is for example 10 to 20 kW. This is enough cooling power to cool a typical heat exchanger by 30° K within 120 sec. The minimum operating time of the compressor 8 might be fixed (for example 120s). Thus there might be no need for a higher compressor speed during this standby cooling of the heat exchanger 7.

For example, if the heat exchanger 7 temperature ("T17" sensor 19 at FIG. 8) falls below first standby temperature threshold ("TS1" at FIG. 8 and for example equal to −37° C.), the refrigeration system (the cooling) or compressor 8 can switched off (on maintained switched off, see ref. 25 at FIG. 8). The heat exchanger 7 temperature can be for example be measured via temperature sensor 19 or calculated based on other parameter(s).

However, if this temperature T17 is above a second standby temperature threshold TS2 (for example above −20° C. or the like) the refrigeration system is (or can) be switched on (see "Y" and ref. 26 at FIG. 8). Otherwise the refrigeration system (the cooling) or compressor can be switched off (on maintained switched off, see ref. 25 at FIG. 8.

The electronic controller 21 may control the refrigeration system so that the set point of the refrigerant temperature at the heat exchanger inlet is a predefined temperature, for example −40° C.

Thus the electronic controller 21 may regulate the evaporation temperature, for example measured at the inlet of the heat exchanger 7. If this temperature increases too much a pressure setpoint at compressor 8 inlet may be decreased (i.e. the temperature to be achieved at the heat exchanger inlet).

The expected pressure losses via the heat exchanger 7 and the compressor suction line might be less than 1 bar. Thus, the effect on the evaporation temperature due to pressure losses can be said less than 2° K in case refrigerant is CO2.

If a different refrigerant is used the temperature effect might be much bigger.

The electronic controller 21 may control the temperature difference between inlet 18 and outlet 17 of heat exchanger 7. If the heat exchanger warms up (given by temperature differential ΔT increase) see reference 27 and arrow "Y" at FIG. 6, the controller 21 can open the expansion valve 10 (see reference 122 at FIG. 6).

As the heat exchanger 7 cools down, the temperature differential decreases (see arrow "N" at FIG. 6) and the electronic controller 21 will close expansion valve 10 (see reference 23 at FIG. 6).

Thus, the amount of refrigerant flowing in the heat exchanger 7 can be controlled based on this temperature differential (between inlet and outlet). If the differential temperature increases the output of the controller 21 increases and more refrigerant is sent to the heat exchanger (and vice versa). This can be controlled as feed forward control signal on the valve 10.

The minimum output might be adjusted in such a way that at zero load the superheat temperature at the inlet of the compressor 8 is around a predefined temperature (for example +10° K).

In case of a "standby cooling" the setpoint can be higher, for example +20° K.

The electronic controller 21 can control the compressor 8 speed and the bypass valve 15 to maintain a constant pressure at the inlet of the compressor 8.

The superheat control (temperature control) is preferably always in operation. In case the superheat temperature drops too low the expansion valve 10 can be closed as required.

Preferably, if the superheat temperature at the inlet of the compressor is too low the expansion valve 10 is closed independent of the actual cooling demand.

In case the superheat temperature increase too much the expansion valve 10 can be opened as required.

If the superheat temperature at the inlet of the compressor is too low the hot gas bypass valve 15 can be opened.

To avoid complete closing of the expansion valve 10 valve, a minimal opening of the expansion valve 10 can be set. This minimum opening can be set such that the suction temperature at the compressor 8 inlet is always sufficiently superheated due to the hot bypassed gas injection.

In addition to the advantages above, the device may allow a very fast change in cooling power while maintaining a constant evaporation pressure and sufficient superheat at the suction of the compressor 8.

When the device 1 is in the standby mode, the refrigerant (typically liquid CO2) downstream of condenser heat exchanger 9 warms up and may evaporate leading to a pressure increase on the discharge side of the compressor 8. One solution is to start the cooling source 2 for providing cold and lowering the refrigerant pressure. To reduce the number of starts of the cold source 12, as illustrated at FIG. 9, the device may comprise an expansion vessel 29 comprising an inlet connected to the refrigerant cooling loop circuit 20 at the outlet of the compressor 8 side. The expansion vessel 29 comprises an outlet connected to the refrigerant cooling loop circuit 20 at the outlet of the compressor 8 side. The device comprises set of valves 28, 30 for controlling the flow of refrigerant from the circuit 20 (downstream the compressor outlet) to the expansion vessel 29 and from the expansion vessel 29 to the circuit 20 (upstream the compressor 8 inlet). The electronic controller 21 may be configured to open the inlet valve 28 to the expansion vessel 29 until the pressure downstream the compressor 8 is below a certain value (typically open at 35 barg) and close at preset value (for example 33 barg).

When the temperature of heat exchange 7 is too high or when the pressure in the expansion vessel 29 is too high (for example above 15 barg) the cold source 12 might be started and the compressor 8 might be started. Outlet valve 30 of expansion vessel 29 might be opened and the pressure in the expansion vessel 29 is thus reduced to appropriate value again (10 barg for example).

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A device for refuelling containers with pressurized gas, comprising: a pressurized gas source; a refrigeration system adapted and configured for cooling gas flowing from the gas source prior to entering of said flowing gas into the container; an electronic controller; a differential temperature sensor system; and a transfer circuit that comprises one upstream end connected to the gas source and at least one downstream end intended to be removably connected to a container, wherein:
   the refrigeration system comprises a refrigerant cooling loop circuit comprising, arranged in series, a compressor, a condenser section, an expansion valve and an evaporator section;
   the refrigeration system further comprises a cold source in heat exchange with the condenser section and a heat exchanger that is located in the transfer circuit and which comprises a heat exchange section between the gas flowing in the transfer circuit and the evaporator section;
   the differential temperature sensor system is adapted and configured for measuring a difference between a temperature of the refrigerant in the refrigerant cooling loop circuit at an outlet of the heat exchanger and a temperature of the refrigerant in the cooling loop circuit at an inlet of the heat exchanger; and
   the electronic controller is connected to the expansion valve and is adapted and configured for controlling cooling power produced by the refrigeration system, via the control of an opening of the expansion valve, as a function of the measured temperature difference.

2. The device of claim 1, wherein the electronic controller is configured to increase the amount of refrigerant sent to the heat exchanger if the differential temperature increases.

3. The device of claim 1, wherein the electronic controller is configured to decrease the amount of refrigerant sent to the heat exchanger if the differential temperature decreases.

4. The device of claim 1, wherein the electronic controller is configured for controlling the cooling power produced as a feed forward control signal on the expansion valve opening.

5. The device of claim 1, wherein the measured difference in temperature is calculated based on temperature sensors located respectively at the outlet and inlet of the heat exchanger.

6. The device of claim 1, wherein the expansion valve opening is controlled via a closed loop control on refrigerant temperature difference between inlet and outlet of the heat exchanger.

7. The device of claim 1, wherein the cooling power is controlled with proportional and/or modulated opening times of the expansion valve.

8. The device of claim 1, wherein the refrigerant cooling loop circuit comprises a bypass conduit comprising an upstream end connected to the outlet of the compressor and a downstream end connected to the refrigerant cooling loop circuit upstream the compressor inlet and which bypasses the condenser section and expansion valve, the device further comprising a bypass regulating valve for controlling a flow of refrigerant flowing into the by-pass conduit.

9. The device of claim 8, wherein the downstream end of the bypass conduit is connected at the outlet of the heat exchanger of the transfer circuit, the bypass regulating valve is a controlled valve able to be set in a closed position or a plurality of open positions for varying the flowrate of refrigerant flowing in the bypass conduit, and the electronic controller is connected to the bypass valve and is configured for controlling the opening of the bypass regulating valve.

10. The device of claim 1, wherein the electronic controller is configured to generate or receive a signal indicative of the cooling power needed at the heat exchanger for cooling the flow of gas in the transfer circuit through the heat exchanger and, in response, for controlling the cooling power produced by the refrigeration accordingly.

11. A process for refuelling containers with pressurized gas with a device comprising a gas source and a transfer circuit for transferring compressed gas from the gas source to a container, the process comprising the steps of:
   cooling a heat exchanger located in the transfer circuit, the heat exchanger being in heat exchange with the gas flowing from the source to the container, the step of cooling comprising the production of a cooling power in an evaporator section of a refrigerant cooling loop circuit, the refrigerant cooling loop circuit comprising, arranged in series, a compressor, a condenser section, an expansion valve and the evaporator section, the condenser section being in heat exchange with a cold source; and
   controlling the cooling power produced as a function of the temperature differential between the temperature of the refrigerant in the refrigerant cooling loop circuit at an outlet of the heat exchanger and the temperature of the refrigerant in the cooling loop circuit at an inlet of the heat exchanger.

12. The process of claim 11, wherein the gas is hydrogen and the containers are gaseous hydrogen tanks.

13. The process of claim 11 wherein the expansion valve opening is controlled via a closed loop control on refrigerant temperature difference between inlet and outlet of the heat exchanger.

14. The process of claim 11, further comprising a step of increasing the amount of refrigerant sent to the heat exchanger if the differential temperature increases.

15. The process of claim 11, further comprising a step of decreasing the amount of refrigerant sent to the heat exchanger if the differential temperature decreases.

16. The process of claim 11, further comprising a step of controlling the cooling power produced at the evaporator section of the refrigerant cooling loop circuit as a function of a signal indicative of the cooling power demand at the heat exchanger, said signal including at least one among: the quantity or flowrate of gas flowing through the transfer circuit, the temperature of the gas flowing through the transfer circuit, the pressure of the gas flowing through the transfer circuit, a pressure or pressure change in the gas source, a demand from a user for refuelling a container, a wireless signal.

* * * * *